United States Patent [19]

Czachorski et al.

[11] Patent Number: 5,186,012

[45] Date of Patent: Feb. 16, 1993

[54] REFRIGERANT COMPOSITION CONTROL SYSTEM FOR USE IN HEAT PUMPS USING NON-AZEOTROPIC REFRIGERANT MIXTURES

[75] Inventors: Marek Czachorski, Darien; Kenneth J. Kountz, Palatine, both of Ill.

[73] Assignee: Institute of Gas Technology, Chicago, Ill.

[21] Appl. No.: 764,788

[22] Filed: Sep. 24, 1991

[51] Int. Cl.$^5$ .............................................. F25B 45/00
[52] U.S. Cl. ...................................... 62/114; 62/174; 62/324.4; 62/149
[58] Field of Search ................ 62/149, 114, 324.1, 62/324.4, 324.6, 174, 502

[56] References Cited

U.S. PATENT DOCUMENTS

| | | | |
|---|---|---|---|
| 2,492,725 | 12/1949 | Ashley | 62/115 |
| 2,841,965 | 7/1958 | Etherington | 62/513 |
| 2,867,094 | 1/1959 | Herrick | 62/174 |
| 2,938,362 | 5/1960 | Schwind | 62/149 |
| 2,951,350 | 9/1960 | Etherington et al. | 62/149 |
| 4,416,119 | 11/1983 | Wilson et al. | 62/149 |
| 4,423,603 | 1/1984 | Oguni et al. | 62/324.1 |
| 4,439,996 | 4/1984 | Frohbieter | 62/174 |
| 4,528,823 | 7/1985 | Mochizuki et al. | 62/324.6 |
| 4,671,077 | 6/1987 | Paradis | 62/324.1 |
| 4,722,195 | 2/1988 | Suzuki et al. | 62/149 |
| 4,724,679 | 2/1988 | Radermacher | 62/101 |
| 4,769,999 | 9/1988 | Fujiwara et al. | 62/114 |
| 4,777,805 | 10/1988 | Hashizume | 62/114 |
| 4,840,042 | 6/1989 | Ikoma et al. | 62/324.1 |
| 4,843,837 | 7/1989 | Ogawa et al. | 62/324.1 |
| 4,943,388 | 7/1990 | Shankland et al. | 252/69 |
| 4,948,526 | 8/1990 | Fellows et al. | 252/69 |
| 4,961,323 | 10/1990 | Katsuna et al. | 62/244 |
| 4,978,467 | 12/1990 | Shankland et al. | 252/69 |
| 4,997,589 | 3/1991 | Lund et al. | 252/172 |
| 5,062,275 | 11/1991 | Hirata et al. | 62/174 |

Primary Examiner—Henry A. Bennet
Assistant Examiner—William C. Doerrler
Attorney, Agent, or Firm—Speckman & Pauley

[57] ABSTRACT

A heat pump system using a non-azeotropic refrigerant mixture comprising a main refrigeration circuit, an engine coolant circuit, and a refrigerant rectifier circuit interfacing with main refrigeration circuit, and the engine coolant circuit. The refrigerant rectifier circuit comprises in order of decreasing relative elevation a condenser, a storage vessel in communication with a condenser, a rectifier in communication with a storage tank and a condenser, a receiver vessel in communication with a rectifier, and a boiler in communication with the rectifier and the receiver vessel. The refrigerant rectifier circuit is used to adjust the relative concentrations of lower boiling point refrigerant, and higher boiling point refrigerant in the non-azeotropic refrigerant mixture thereby changing the cooling or heating capacity of the heat pump system.

15 Claims, 7 Drawing Sheets

REFRIGERANT COMPOSITION CONTROL SYSTEM FOR USE IN HEAT PUMPS USING NON-AZEOTROPIC REFRIGERANT MIXTURES

BACKGROUND OF THE INVENTION

1. Field of the Invention

This invention relates to an improved method and apparatus for controlling the cooling and heating capacity of a variable speed heat pump using non-azeotropic refrigerant mixtures to maintain an optimum match between the heat pump capacity and the load requirement of a conditioned space.

2. Description of the Prior Art

The application of mixed refrigerant systems to heat pumps, air conditioning systems, chillers, and refrigerators/freezers represents known prior art. Such an application is disclosed by U.S. Pat. No. 4,722,195 which teaches a heat pump apparatus using a non-azeotropic refrigerant mixture in which the refrigerant mixture is circulated in a main refrigeration circuit and the high pressure and low pressure refrigerant components of the mixture are separated by a rectifier. The higher pressure refrigerant is stored in a reservoir to permit a mixture having a higher content of lower pressure refrigerant to recirculate in the main refrigeration circuit during a low power mode of operation. The higher pressure refrigerant is released from the reservoir to permit a mixture with an intrinsic ratio of higher-to-lower pressure refrigerants to recirculate in the circuit during high power mode operations. The rectifier circuit for separating the higher pressure refrigerant from the lower pressure refrigerant includes a rectifier, a reservoir for storing separated higher pressure refrigerant in liquid phase and feeding an overflowed portion of the stored refrigerant back to the rectifier, a condenser disposed between the top of the rectifier and the reservoir to condense vaporized fluid, a capillary tube in communication with the bottom of the rectifier, and a solenoid valve in communication with the bottom of the reservoir, and at the other end of the capillary tube serving as a by-pass to the rectifier circuit. Two check valves are employed in conjunction with the capillary tubes to control the flow of working fluid into the main refrigeration circuit.

Other such applications are disclosed by U.S. Pat. No. 2,841,965 which teaches a multi-refrigerant, dual capacity refrigeration system in which a three-way valve in combination with a load sensing device is used to control the refrigerant composition; U.S. Pat. No. 2,492,725 which teaches a multi-refrigerant system in which refrigerant vapor and refrigerant liquid flow together in a parallel relationship such that in condensing the refrigerant mixture, initial condensation, which occurs at a relatively high temperature, results in formation of condensation rich in the component of higher boiling point and poor in the component of the lower boiling point; U.S. Pat. No. 2,867,094 which teaches a multi-refrigerant system in which a threeway, three-position valve is used in conjunction with a load sensing and sequence control device to control the composition of the refrigerant; U.S. Pat. No. 2,938,362 which teaches a multi-refrigerant system having a compressor of fixed biometric displacement, a condenser, an evaporator, and an expansion valve or capillary tube between the condenser and evaporator to reduce the pressure of the refrigerant flowing from the condenser to the evaporator, which components make up an active refrigeration circuit, and a rectifier in a refrigerant rectifier circuit, having a heater in the base to heat the refrigerant mixture and activate the system; U.S. Pat. No. 4,423,603 which teaches a heat pump refrigeration system for air conditioning utilizing multiple refrigerants in which the suction side and discharge side of a compressor are switchable between an indoor heat exchanger and an outdoor heat exchanger by a four-way valve for controlling the relative concentrations of the refrigerants; and U.S. Pat. No. 4,769,999 which teaches a gas-liquid contactor for use in a refrigeration cycle for varying the mixing ratio of a non-azeotropic refrigerant mixture circulated through the refrigeration cycle.

Multi-refrigerant systems for refrigerators are disclosed by U.S. Pat. Nos. 4,416,119 and 4,439,996 while U.S. Pat. No. 2,951,350 teaches an absorption refrigeration system in which molecular sieve is used an absorbent. U.S. Pat. No. 4,671,077 teaches an ice maker heat pump which uses water supercooling.

U.S. Pat. No. 4,528,823 teaches a heat pump apparatus having a main refrigerant circuit and an auxiliary shunting refrigerant line having a compressor, condenser, and a pressure reducer means for shunting from the gaseous phase portion of the gas-liquid separator of the main refrigerant circuit and merging in the evaporator of the main refrigerant circuit.

Other applications of non-azeotropic refrigerant mixtures to heating and cooling processes are disclosed by U.S. Pat. Nos. 4,724,679, 4,843,837, and 4,961,323. U.S. Pat. No. 4,777,805 discloses a multi-stage heat pump system using a single working medium in which the condenser or evaporator has a plurality of heat exchange chambers, and the compressor has a plurality of ports (suction or delivery) that are on different pressure levels.

Various azeotrope-like mixtures are disclosed by U.S. Pat. Nos. 4,943,388, 4,948,526, 4,978,467, and 4,997,589.

SUMMARY OF THE INVENTION

It is an object of this invention to control the composition of the refrigerant mixture of a heat pump system using non-azeotropic refrigerant mixtures to maintain a match between the heat pump capacity and the load requirement of a conditioned space.

It is another object of this invention to provide a heat pump system having a high seasonal performance efficiency.

It is another object of this invention to provide a heat pump system requiring limited starts and stops.

It is yet another object of this invention to provide a heat pump system in which the engine and compressor reliability and endurability are increased over the known prior art.

It is still another object of this invention to provide a heat pump system which provides better comfort conditions in the conditioned space by reducing the attendant thermal swings in the conditioned space.

These and other objects are achieved in accordance with this invention in a heat pump system comprising a main refrigeration circuit, a refrigerant rectifier circuit, and an engine coolant circuit in which the refrigerant rectifier circuit, without the use of pumping means, check valves or expansion devices, such as capillary tubing, changes the composition of a non-azeotropic refrigerant circulating through the main refrigeration circuit, thereby increasing or decreasing the capacity of the heat pump. A non-azeotropic refrigerant is comprised of at least two refrigerant components, one of which has a higher boiling point than the other. By increasing the amount of the lower boiling point component in the circulating refrigerant relative to the amount of higher boiling point component therein, the capacity of the heat pump is increased because the temperature range and quantity of the air from the conditioned space which can be conditioned is greater than when the circulating refrigerant has a higher level of a higher boiling point refrigerant.

One important feature of this invention is the refrigerant rectifier circuit which controls the circulating refrigerant mixture composition by separating the lower boiling point component of the mixture and storing it in a storage vessel to decrease the capacity of the heat pump and by releasing the lower boiling point refrigerant component from the storage container and reintroducing it into the circulating refrigerant mixture, thereby increasing the capacity of the heat pump. The refrigerant rectifier circuit in accordance with one embodiment of this invention comprises a condenser, a storage vessel in communication with the condenser, a rectifier having a top portion in communication with the storage vessel and condenser, a receiver vessel in communication with the bottom portion of the rectifier, and a boiler in communication with the bottom portion of the rectifier and the receiver vessel. In addition, the refrigerant rectifier circuit comprises an engine coolant circuit interface means for interfacing with the engine coolant circuit, preferably a heat exchanger in heat exchange relationship with the boiler, and a refrigeration circuit interface means for interfacing with the main refrigeration circuit, preferably a liquid refrigerant inlet conduit and a liquid refrigerant outlet conduit in communication with the receiver vessel. Thus, refrigerant from the refrigerant rectifier circuit flows into the receiver vessel through the liquid refrigerant inlet conduit and into the main refrigeration circuit through a refrigeration circuit refrigerant flow conduit, which is also in communication with the receiver vessel. The driving force for circulating the refrigerant from the main refrigeration circuit through the refrigerant rectifier circuit is the result of the combined action of the boiler, condenser, and gravitational forces, the latter being implemented by proper location of the refrigerant rectifier circuit components at specified, different levels of elevation relative to one another, a critical aspect of this invention.

To control the composition of the circulating refrigerant mixture, the heat pump system, in accordance with one embodiment of this invention, is provided with a mixture composition means for determining the composition of the non-azeotropic refrigerant mixture, said means generating pressure and temperature signals from the receiving vessel. The signals are generated by any number of well-known transducer technologies, for example, a strain gauge transducer for measuring pressure and a thermistor for measuring temperature. The combination of these signals, together with computer-memory stored vapor pressure curves of each of the refrigerant components, forms the "sensor" for determination of the composition of the circulating refrigerant in the main refrigeration circuit. The sensed composition of the refrigerant forms a feedback signal for a mixture control system comprising storage vessel valve means for controlling the flow of a lower boiling point component of said non-azeotropic refrigerant mixture to the receiver vessel and receiver vessel valve means for controlling the flow of non-azeotropic refrigerant mixture from the receiver vessel to the refrigerant rectifier.

In accordance with one embodiment of this invention, a lower boiling point refrigerant component of the non-azeotropic refrigerant mixture is stored in a storage vessel. To increase the capacity of the heat pump system, the storage vessel valve means, preferable a solenoid valve at an outlet of the storage vessel is opened permitting the lower boiling point refrigerant to flow into the receiver vessel, which is in communication with the main refrigeration circuit refrigerant flow conduit, thereby increasing the amount of lower boiling point refrigerant in the circulated refrigerant composition. The refrigerant in the receiver vessel is then circulating through the main refrigeration circuit to provide the desired heating or cooling.

To decrease the capacity of the heat pump system, the solenoid valve at the output of the storage vessel is closed and the receiver vessel valve means, preferably a solenoid valve at an outlet of the receiver vessel, is opened, thereby permitting the non-azeotropic refrigerant mixture to flow out of the receiver vessel, through the boiler, and into the rectifier of the refrigerant rectifier circuit. The rectifier separates the lower boiling point component from the higher boiling point component of the refrigerant mixture, condensing the lower boiling point refrigerant and circulating it to the storage vessel, while circulating the higher boiling point refrigerant back into the receiver vessel, thereby increasing the concentration of higher boiling point refrigerant in the non-azeotropic refrigerant mixture circulating in the main refrigeration circuit.

These and other objects and features of this invention will be more readily understood and appreciated from the description and drawings contained herein.

DESCRIPTION OF PREFERRED EMBODIMENTS

Figure 4:
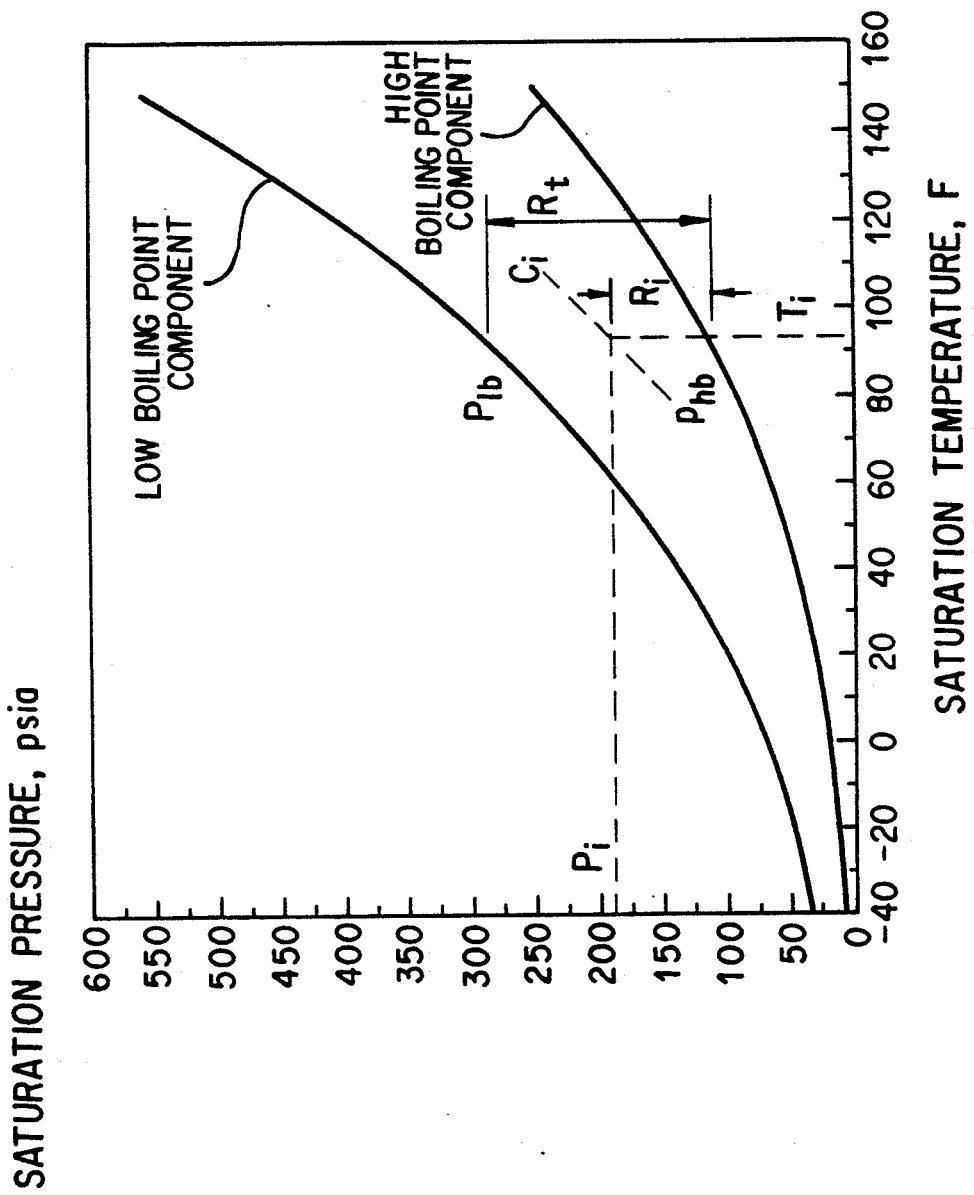
FIG. 4 shows the vapor pressure curves for two components in a non-azeotropic mixed refrigerant system.
Figure 5:
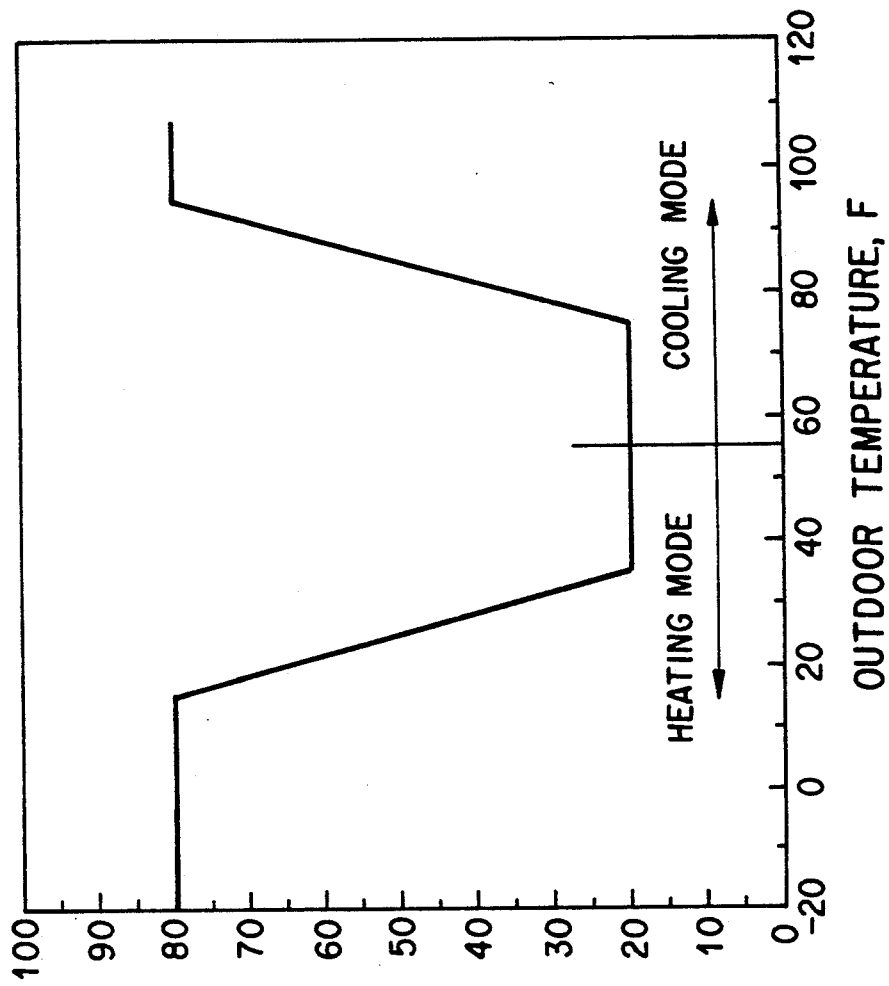
FIG. 5 is a graphic representation of the desired primary control function for a non-azeotropic refrigerant mixture in both the cooling and heating modes of the heat pump system in accordance with one embodiment of this invention.

As previously stated, one object of this invention is to control the capacity of a heat pump system which uses a non-azeotropic refrigerant mixture by altering the composition of the refrigerant mixture to provide a high seasonal performance efficiency. For purposes of this disclosure, as used in the specification and claims, the low capacity levels in cooling correspond to loads on the conditioned space when the outdoor temperature is less than 75° F., while in heating, the low capacity levels correspond to the conditioned space when the outdoor temperature is greater than 35° F. as shown in FIG. 5. Such low capacity levels correspond to an amount of a lower boiling point refrigerant component circulating in the main refrigeration circuit of about 20% of the total refrigerant mixture circulating in the main refrigeration circuit. For intermediate loads in cooling and heating, the amount of lower boiling point component in the circulating refrigerant mixture is increased up to about 80%. The highest capacity for the heat pump system, in accordance with one embodiment of this invention, occurs at the highest amount of lower boiling point refrigerant circulating in the main refrigeration circuit, approximately 80% of the total circulating refrigerant mixture. Accordingly, the heat pump system, in accordance with one embodiment of this invention, which controls refrigerant composition as shown in FIG. 4, has high seasonal efficiency and experiences a minimum number of system starts and stops. This is because the increased load matching range of the mixed refrigerant heat pump, in accordance with this invention, tracks the load profile on a conditioned space better than a system using a single component refrigerant resulting in a much lower number of seasonal starts and stops on the system.

Figure 1:
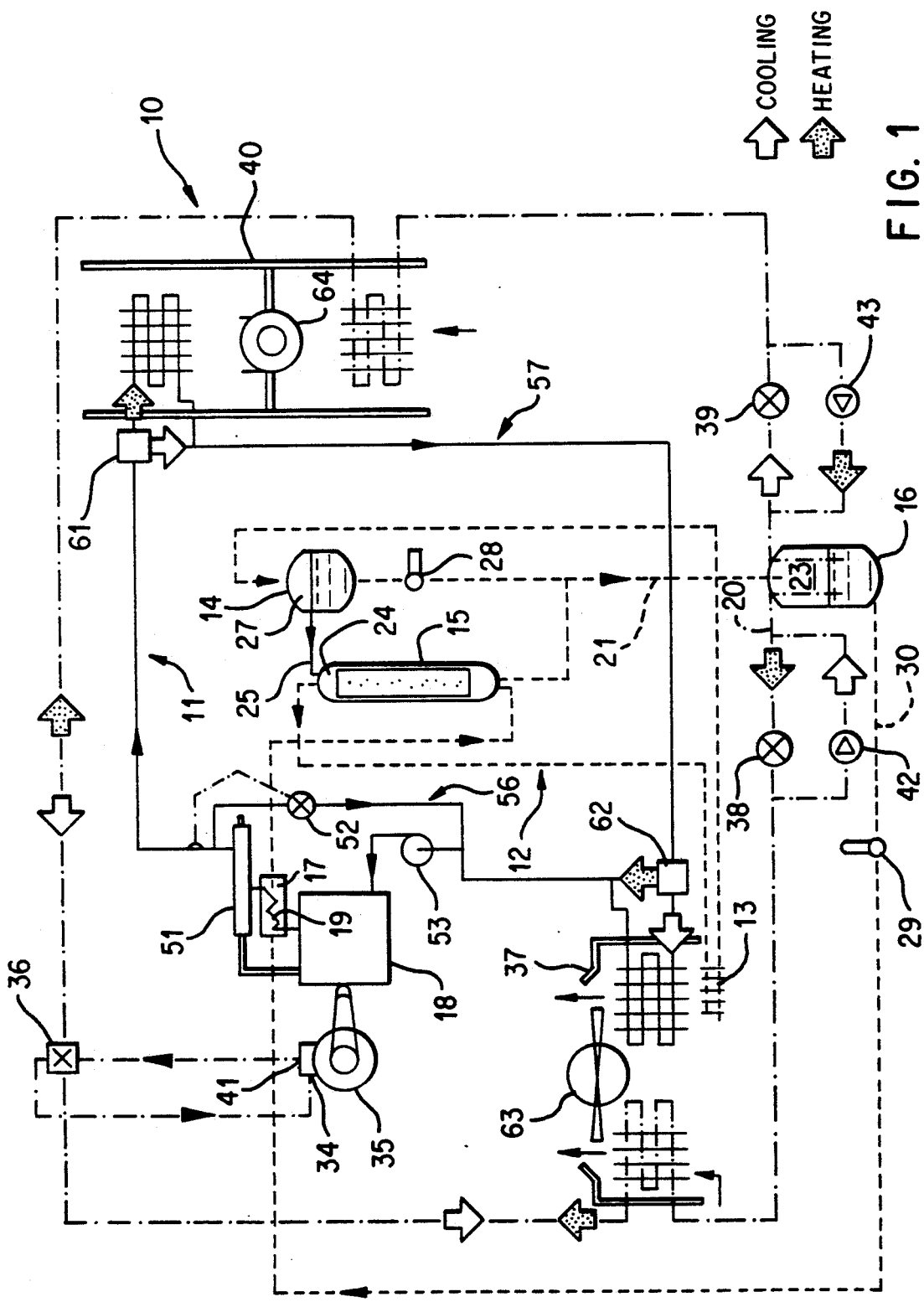
FIG. 1 is a schematic diagram of the heat pump system utilizing a non-azeotropic refrigerant mixture in accordance with one embodiment of this invention.

The heat pump system, in accordance with one embodiment of this invention, is shown in FIG. 1. The heat pump system comprises a main refrigeration circuit 10, an engine coolant circuit 11, and a refrigerant rectifier circuit 12. The main refrigeration circuit comprises components generally used in the heating and cooling industry, namely compressor 35, four-way valve 36, outdoor heat exchanger 37 having outdoor fan 63, outdoor expansion valve 38, indoor expansion valve 39, indoor heat exchanger 40 having indoor fan 64, and refrigeration circuit interface means for interfacing with refrigerant rectifier circuit 12, preferably through receiver vessel 16.

During the cooling operation, compressed refrigerant mixture vapor flows from compressor discharge 41 through four-way valve 36 which routes the vapor to outdoor heat exchanger 37. Outdoor heat exchanger 37, acting as a condenser in the cooling mode, condenses the compressed refrigerant mixture vapor, forming a liquid refrigerant mixture, which flows to receiver vessel 16 through cooling refrigerant check valve 42. From receiver vessel 16, the liquid refrigerant mixture flows through indoor expansion valve 39 and into indoor heat exchanger 40, which acts as an evaporator in the cooling mode. From indoor heat exchanger 40, the refrigerant mixture vapor, at low pressure, flows through four-way valve 36 and is routed to the suction side 34 of compressor 35, thereby completing the main refrigeration circuit.

During the heating operation, the compressed refrigerant mixture vapor flows from compressor discharge 41 through four-way valve 36 to indoor heat exchanger 40, which acts as a condenser in the heating mode. From indoor heat exchanger 40, the liquified refrigerant mixture flows to receiver vessel 16 through heating refrigerant check valve 43. From receiver vessel 16, the liquified refrigerant mixture flows through outdoor expansion valve 38 to outdoor heat exchanger 37, which acts as an evaporator in the heating mode. The refrigerant mixture vapor at low pressure flows from outdoor heat exchanger 37 through four-way valve 36 by which it is routed to the suction side of compressor 35, again completing the main refrigeration circuit.

Engine coolant circuit 11 comprises an inner loop circuit 56 and an outer loop circuit 57. Inner loop 56 comprises combustion engine 18, boiler 17, exhaust gas heat recuperator 51, engine coolant thermostat 52, and coolant pump 53. Outer loop 57, in addition to combustion engine 18, exhaust gas heat recuperator 51, and coolant pump 53, further comprises indoor three-way valve 61, outdoor three-way valve 62, indoor heat exchanger 40, and outdoor heat exchanger 37. After combustion engine 18 starts, coolant pump 53 circulates coolant through boiler 17, exhaust gas heat recuperator 51, and engine coolant thermostat 52 back to combustion engine 18. When the combustion engine temperature reaches a desired level, engine coolant thermostat 52 partially closes inner loop circuit 56, forcing coolant through outer loop circuit 57 containing indoor heat exchanger 40 and outdoor heat exchanger 37. In the cooling mode, outdoor three-way valve 62 directs coolant through outdoor heat exchanger 37 while indoor three-way valve 61 routes the coolant around indoor heat exchanger 40. In this mode, the waste heat generated by combustion engine 18, less any heat used by refrigerant rectifier circuit 12, is removed by the environmental air passing through outdoor heat exchanger 37. In the heating mode, indoor three-way valve 61 routes coolant through indoor heat exchanger 40 while outdoor three-way valve 62 routes coolant around outdoor heat exchanger 37. In this mode, waste heat generated by combustion engine 18, less any heat used by refrigerant rectifier circuit 12, is recovered by the conditioned space air passing through indoor heat exchanger 40. Recovery of the engine heat in this manner augments the heating capacity of the heat pump system which is obtainable from the main refrigeration circuit alone.

Refrigerant rectifier circuit 12, which constitutes the essence of this invention, is disposed in an outdoor unit of the heat pump system and comprises boiler 17, which is in heat exchange relationship with the engine coolant, rectifier 15, condenser 13, which is a heat exchanger in heat exchange relationship with the environmental air, storage vessel 14, storage vessel solenoid valve 28, and receiver vessel solenoid valve 29. Refrigerant rectifier circuit 12 has refrigerant circuit interface means for interfacing with main refrigeration circuit 10. Said refrigerant circuit interface means comprises liquid refrigerant inlet conduit 21 and liquid refrigerant outlet conduit 30 connected to and in communication with receiver vessel 16. Liquid refrigerant inlet conduit 21 is connected to the top of receiver vessel 16 while liquid refrigerant outlet conduit 30 is connected to the bottom of receiver vessel 16. The combined action of boiler 17, condenser 13, and gravitation forces drive a portion of the liquid refrigerant mixture from main refrigerant circuit 10 through refrigerant rectifier circuit 12. This is accomplished by appropriate location of the components of refrigerant rectifier circuit 12 at specified, different levels of elevation relative to one another as shown in FIG. 2, and by control of lower boiling point refrigerant outflow from storage vessel 14 using storage vessel solenoid valve 28 and by control of refrigerant outflow from receiver vessel 16 into refrigerant rectifier circuit 12 using receiver vessel solenoid valve 29.

Figure 2:
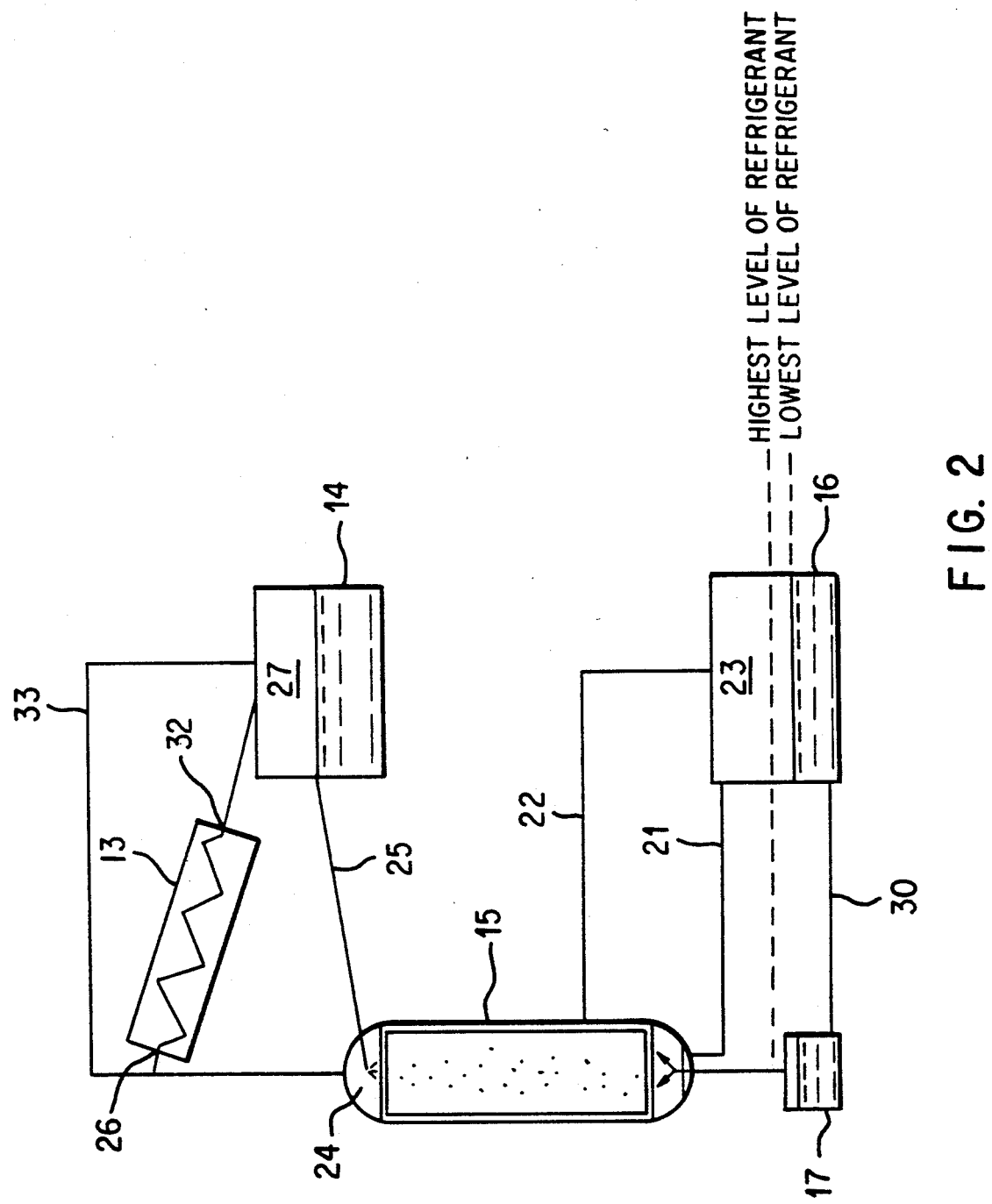
FIG. 2 is a schematic diagram of the refrigerant rectifier circuit showing the relative elevations of the components thereof in accordance with one embodiment of this invention.

In accordance with one embodiment of this invention, the components comprising refrigerant rectifier circuit 12 are interconnected as shown in FIG. 2. Receiver vessel 16 is positioned elevationally relative to the other circuit components such that at the lowest level of refrigerant in receiver vessel 16, boiler 17 is flooded and at the highest level of refrigerant in receiver vessel 16, the bottom portion of rectifier 15 does not flood. Liquid refrigerant inlet conduit 21 connects receiver vessel 16 to the bottom portion of rectifier 15 to assure full liquid removal from rectifier 15.

Rectifier 15 is provided with a rectifier vapor space 24 with which receiver pressure equalization line 22 is in communication. The other end of receiver pressure equalization line 22 is in communication with a receiver vapor space 23 disposed above the refrigerant level in receiver vessel 16. The purpose of receiver pressure equalization line 22 is to smooth out the dynamic pressure fluctuations in refrigerant rectifier circuit 12 due to rapid changes in the speed of engine 18 in engine coolant circuit 11. In addition, receiver pressure equalization line 22 aids in the prevention of liquid splash back into rectifier 15 from receiver vessel 16 through liquid refrigerant inlet conduit 21.

Condenser 13 is provided with vapor inlet port 26 located at the highest elevational level in refrigerant rectifier circuit 1 and liquid outlet port 32 located above the highest liquid level in storage vessel 14, where storage vessel overflow conduit 25 connects to storage vessel 14. Storage vessel pressure equalization conduit 33 is in communication with vapor inlet port 26 a storage vessel vapor space 27 disposed above the liquid level in storage vessel 14.

During low capacity cooling or heating operation, where the amount of the lower boiling point refrigerant component of the non-azeotropic refrigerant mixture circulating in main refrigeration circuit 10 is reduced, storage vessel solenoid valve 28 is closed, thereby interrupting the flow of lower boiling point refrigerant from storage vessel 14 into receiver vessel 16, and receiver vessel solenoid valve 29 is opened, thereby permitting the flow of liquid non-azeotropic refrigerant mixture from receiver vessel 16 through liquid refrigerant outlet conduit 30 into boiler 17, which is disposed at a lower level of elevation. Using heat from the engine coolant, the liquid non-azeotropic refrigerant mixture is boiled, producing refrigerant vapor, which enters the bottom of rectifier 15 from which it ascends through rectifier 15 to condenser 13, located at the highest level of all components in refrigerant rectifier circuit 12. The refrigerant is liquified in condenser 13 after which the predominantly lower boiling point refrigerant component flows downward into storage vessel 14.

Storage vessel 14, positioned elevationally above rectifier 15, is provided with storage vessel overflow conduit 25 in communication with storage vessel 14 and the top portion of rectifier 15. Overflowing refrigerant from storage vessel 14 enters the upper end of rectifier 15. The resulting downward flow of the liquid lower boiling point refrigerant, in conjunction with the upper flow of higher boiling point refrigerant vapor, generates the rectification action in rectifier 15. The upwardly flowing higher boiling point refrigerant vapors become richer in the lower boiling point refrigerant while, the downward flowing liquid lower boiling point refrigerant captures more of the higher boiling point refrigerant, resulting in an increase in the content of the lower boiling point refrigerant liquid in storage vessel 14. Simultaneously, the liquid refrigerant having a higher concentration of higher boiling point refrigerant flows downward through rectifier 15 and through liquid refrigerant inlet conduit 21 into receiver vessel 16 in which it mixes with the refrigerant mixture circulating in main refrigeration circuit 10. Thus, as the concentration of lower boiling point refrigerant circulating in main refrigeration circuit 10 decreases, the cooling or heating capacity of the heat pump system also decreases.

During high capacity cooling or heating operation, where the concentration of lower boiling point refrigerant circulating in main refrigeration circuit 10 is increased, storage vessel solenoid valve 28 is opened, permitting the predominantly lower boiling point refrigerant in storage vessel 14 to flow into receiver vessel 16 and mix with liquid refrigerant circulating in main refrigerant circuit 10, thereby entering main refrigerant circuit 10. To interrupt the rectification process within rectifier 15, receiver vessel solenoid valve 29 is closed, thereby interrupting the flow of non-azeotropic refrigerant mixture to boiler 17.

Figure 3:
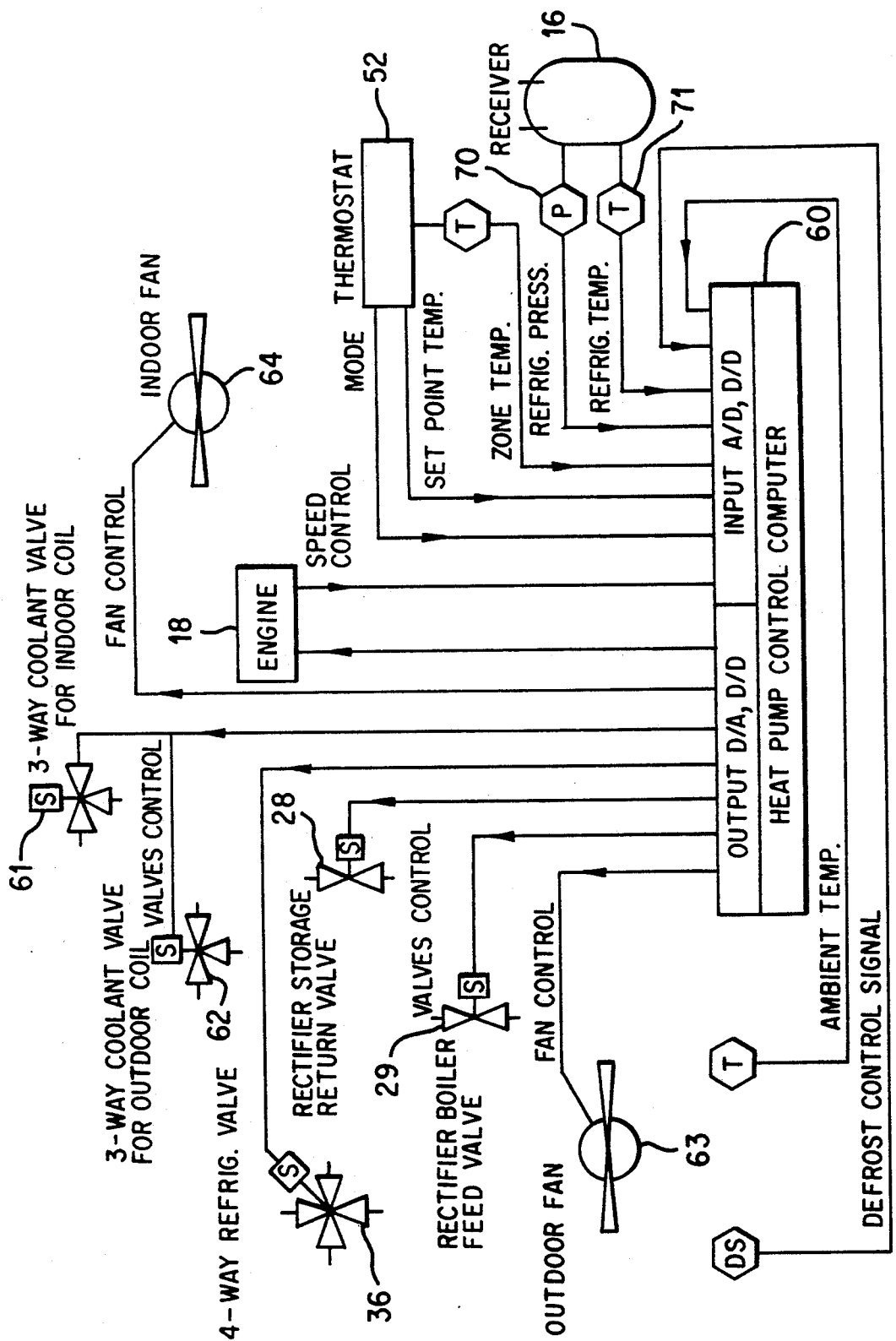
FIG. 3 is a schematic diagram of the heat pump control signal flow in accordance with one embodiment of this invention.

In FIG. 3, a control signal flow diagram from an engine driven heat pump utilizing a non-azeotropic refrigerant mixture of controlled composition in main refrigeration circuit 10 in accordance with one embodiment of this invention is shown. Heat pump control computer 60 is provided with analog and digital signal input and output channels, having the proper current and voltage matching required between the computer and each component and sensor of the heat pump system. The heat pump signals to the commonly used heat pump components, such as four-way valve 36, combustion engine 18, indoor three way valve 61, outdoor three way valve 62, and engine coolant thermostat 52, are not discussed in this disclosure, as no uniqueness in their operation is claimed.

Of particular interest in the operation of this invention are the refrigerant pressure signal 70 and refrigerant temperature signal 71 from receiver vessel 16. These signals are generated by any number of well-known transducer technologies, such as strain gauge transducers for measuring pressure and thermistors for measuring temperature. The combination of these signals, together with computer-memory-stored vapor pressure curves of each of the components of the non-azeotropic refrigerant mixture, is used to determine the composition of the refrigerant circulating in main refrigeration circuit 10. The sensed composition of the refrigerant forms a feedback signal for controlling the mixture control system.

Shown in FIG. 4 are vapor pressure curves for two refrigerant components in a binary mixed refrigerant system. At any measured saturation temperature, $T_i$, a lower boiling point component will have a higher vapor pressure, $P_{lb}$, than the vapor pressure, $P_{hb}$, of the higher boiling point component. The vapor pressure of a mixture of these components having a concentration $C_j$ of higher boiling point component will depend on the relative mass density of each component in the mixture. It can be shown, within an acceptable degree of accuracy, that $C_i$ will be proportional to the ratio $R_i$ to $R_t$, the respective pressure differences, $(P_i - P_{hb})$ and $(P_{lb} - p_{hb})$, where $P_i$ is the measured pressure in receiver vessel 16.

In FIG. 5, the desired primary control function for a mixed refrigerant system in both heating and cooling modes in accordance with this invention is shown. The relationship shown therein is stored within the memory of the heat pump system control computer 60 and forms the primary set point signal for the composition of the non-azeotropic refrigerant mixture circulating in main refrigeration circuit 10. As can be seen, for outdoor temperatures from about 35° F. to about 75° F., the concentration of lower boiling point refrigerant in the non-azeotropic refrigerant mixture circulating in main refrigeration circuit 10 is about 20%, producing low capacity cooling and heating modes. For intermediate loads from about 20° F. to about 35° F. and about 75° F. to about 95° F., the concentration of lower boiling point refrigerant in the circulating non-azeotropic refrigerant mixture increases up to about 80% at which point the highest concentration of lower boiling point refrigerant is circulating, producing high capacity cooling and heating modes of operation.

Figure 6:
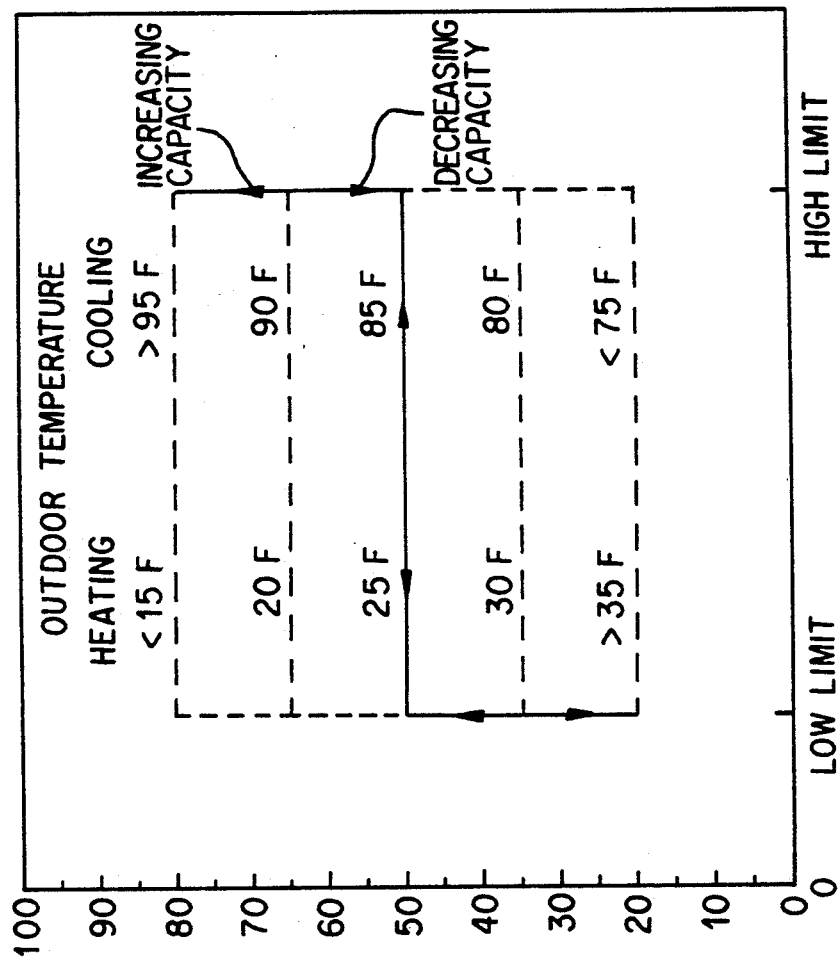
FIG. 6 is a graphic representation of the desired secondary control function for a non-azeotropic refrigerant mixture which takes into account the action of the heat pump system control when the engine of the system is operating at either the lower or upper limit of its operating range.

In FIG. 6, the secondary control function for the non-azeotropic refrigerant mixture is shown in terms of the desired action of the system control when combustion engine 18 is operating either at the lower or upper limit of its operating range. When combustion engine 18 is operated between the lower and upper limits of its operating range, the composition of the non-azeotropic refrigerant mixture in main refrigeration circuit 10 is determined by the primary control function shown in FIG. 5, that is, the composition is determined exclusively by the outdoor temperature.

However, when combustion engine 18 is operated at either the upper or lower limit of its range of operation, the secondary control function shown in FIG. 6 is initiated. For example, when combustion engine 18 is operated at its upper limit, the capacity of the heat pump system can be increased by increasing the concentration of the lower boiling point refrigerant circulating in main refrigeration circuit 10, over and above the amount determined by the primary control function shown in FIG. 5. Conversely, when combustion engine 18 is operated at the lower limit of its range, and the concentration of lower boiling point refrigerant circulating in main refrigeration circuit 10 is above the 20% level, then the controller for the refrigerant rectifier circuit is activated to lower the concentration of the lower boiling point component in the refrigerant mixture circulating in main refrigeration circuit 10. The concentration path function for a 25° F. heating mode operation and an 85° F. cooling mode operation is shown in FIG. 6.

Figure 7:
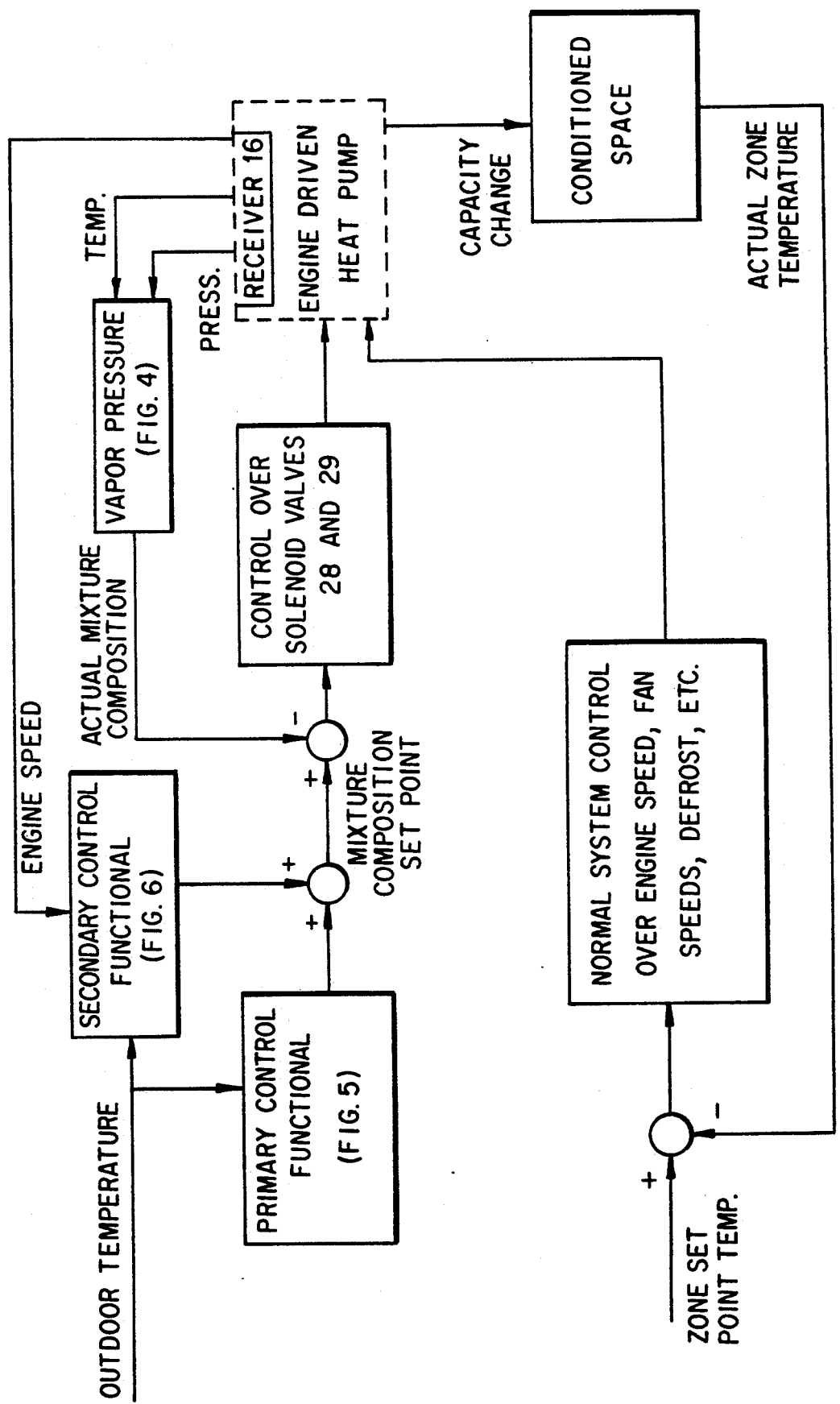
FIG. 7 is a schematic diagram of an overall system control for an engine driven heat pump in accordance with one embodiment of this invention.

The overall system control diagram for an engine driven heat pump in accordance with this invention is shown in FIG. 7. The bottom half of the figure shows a typical control set up for an engine driven heat pump where the major control loop tends to adjust the engine speed, that is, the engine driven compressor speed, to such a value that the zone temperature is satisfied with its set point. Adjusting the compressor speed allows the heat pump, in either the cooling or heating mode, to match the system capacity with a sensible thermal load on a conditioned space, that is, by matching its measured dry bulb temperature with the zone set point.

In the refrigerant mixture control loop shown in the top half of FIG. 7, in accordance with one embodiment of this invention, the outdoor temperature is sensed and a signal proportional to its value is sent to the heat pump system control computer 60 for the computation, using the primary control function shown in FIG. 5, of one component of the refrigerant mixture composition set point. The outdoor temperature, as well as the speed of combustion engine 18, is inputted to the secondary control function shown in FIG. 6 for computation of the other component of the refrigerant mixture composition set point. The mixture set point is then compared with the composition of the refrigerant mixture circulating in main refrigeration circuit 10, as measured by the vapor pressure function shown in FIG. 4. Any error in the circulating mixture from the set point results in a controlled opening and closing of storage vessel solenoid valve 28 and/or receiver vessel solenoid valve 29.

While in the foregoing specification this invention has been described in relation to certain preferred embodiments thereof, and many details have been set forth for purpose of illustration, it will be apparent to those skilled in the art that the invention is susceptible to additional embodiments and that certain details described herein can be varied considerably without departing from the basic principles of the invention.

We claim:

1. A heat pump system using a non-azeotropic refrigerant mixture comprising:
   a main refrigeration circuit;
   an engine coolant circuit;
   a refrigerant rectifier circuit comprising refrigeration circuit interface means for interfacing with said main refrigeration circuit and engine coolant circuit interface means for interfacing with said engine coolant circuit;
   said refrigerant rectifier circuit further comprising, in order of decreasing relative elevation, a condenser, a storage vessel in communication with said condenser, a refrigerant rectifier having a top portion in communication with said storage vessel and said condenser, a receiver vessel in communication with a bottom portion of said refrigerant rectifier, and a boiler in communication with said bottom portion of said refrigerant rectifier and said receiver vessel; and
   said engine coolant circuit interface means comprising a heat exchanger in a heat exchange relationship with said boiler.

2. A heat pump system in accordance with claim 1, wherein said refrigeration circuit interface means comprises a liquid refrigerant inlet conduit in communication with said refrigerant rectifier, said storage vessel and said receiver vessel and a liquid refrigerant outlet conduit in communication with said refrigerant rectifier and said receiver vessel.

3. A heat pump system in accordance with claim 1 further comprising system control means for controlling said heat pump system.

4. A heat pump system in accordance with claim 1, wherein said relative elevation of said receiver vessel and said boiler is such that a lowest refrigerant level in said receiver vessel floods said boiler.

5. A heat pump system in accordance with claim 1, wherein said relative elevation of said rectifier vessel and said receiver vessel is such that a highest refrigerant level in said receiver vessel does not flood said bottom portion of said rectifier vessel.

6. A heat pump system in accordance with claim 1, wherein a liquid refrigerant conduit connects said receiver vessel to a lowest portion of said bottom portion of said rectifier vessel.

7. A heat pump system in accordance with claim 1, wherein a receiver pressure equalization conduit connects said receiver vessel to said rectifier vessel, said receiver pressure equalization conduit in communication with a receiver vapor space in said receiver vessel, and a rectifier vapor space in said rectifier vessel.

8. A heat pump system in accordance with claim 1, wherein said storage vessel is disposed elevationally above said rectifier and is connected by a storage vessel overflow conduit to a top portion of said rectifier vessel at said storage vessel overflow conduit being in communication with said storage vessel and said rectifier vessel.

9. A heat pump system in accordance with claim 1, wherein a vapor inlet port of said condenser is disposed at a highest said relative elevation in said rectifier circuit and a liquid outlet port of said condenser is disposed above a level of a liquid in said storage vessel.

10. A heat pump system in accordance with claim 9, wherein a storage vessel pressure equalization conduit is disposed between said vapor inlet port of said condenser and said storage vessel, in communication with said vapor inlet port and storage vessel vapor space in said storage vessel.

11. A heat pump system in accordance with claim 3, wherein said system control means comprises mixture composition means for determining said composition of said non-azeotropic refrigerant mixture, a computer having at least one memory-stored vapor pressure curve for each component of said non-azeotropic refrigerant mixture, said computer in communication with said mixture composition means and said refrigeration circuit interface means and configured to receive at least one of an analog and a digital signal from said mixture composition means, and feedback means for controlling refrigerant flow through said refrigeration circuit interface means using said signal from said mixture composition means and said vapor pressure curves.

12. A heat pump system in accordance with claim 11, wherein said mixture composition means comprises refrigerant pressure means for measuring a refrigerant pressure in said receiver vessel and refrigerant temperature means for measuring a refrigerant temperature in said receiver vessel.

13. A heat pump system in accordance with claim 12, wherein said feedback means comprises storage vessel valve means for controlling flow of a lower boiling point component of said non-azeotropic refrigerant mixture from said storage vessel to said receiver vessel and receiver vessel valve means for controlling flow of said non-azeotropic refrigerant mixture from said receiver vessel to said refrigerant rectifier.

14. In a heat pump system using a non-azeotropic refrigerant mixture and comprising a main refrigeration circuit and a refrigerant rectifier circuit, a method for controlling said heat pump system comprising:
   comparing a dry bulb zone temperature of a conditioned space with a zone set point for said conditioned space:
   adjusting a speed of a compressor in said main refrigeration circuit such that said zone temperature is satisfied with said zone set point;
   measuring an outdoor temperature which corresponds to a first component of a refrigerant mixture composition set point and inputting a signal corresponding to said outdoor temperature into a heat pump system control computer;
   computing a second component of said refrigerant mixture composition set point from said compressor speed and said outdoor temperature; and
   adjusting a composition of said non-azeotropic refrigerant mixture circulating in said main refrigeration circuit to correspond to said refrigerant mixture composition set point.

15. A method for controlling a heat pump system in accordance with claim 15, wherein said composition of said non-azeotropic refrigerant mixture is adjusted by measuring a temperature and a pressure of said non-azeotropic refrigerant mixture in a receiver vessel in said main refrigeration circuit;
   inputting said temperature measurement and said pressure measurement to said heat pump system control computer, said computer having at least one computer-memory stored vapor pressure curve for each of said components of said non-azeotropic refrigerant mixture;
   computing said composition of said non-azeotropic refrigerant mixture from said temperature measurement, said pressure measurement, and said vapor pressure curves, forming a feedback signal; and
   transmitting said feedback signal to at least one of a storage vessel valve means for controlling flow of a lower boiling point component of said non-azeotropic refrigerant mixture into said receiver vessel and a receiver vessel valve means for controlling flow of said non-azeotropic refrigerant mixture from said receiver vessel into a refrigerant rectifier in said refrigerant rectifier circuit, producing one of an increased concentration and a decreased concentration of said lower boiling point component in said non-azeotropic refrigerant mixture.

* * * * *